United States Patent
James

(10) Patent No.: US 9,346,554 B2
(45) Date of Patent: May 24, 2016

(54) VENT FOR AN AIRCRAFT WING FUEL TANK

(71) Applicant: AIRBUS OPERATIONS LIMITED, Bristol (GB)

(72) Inventor: Dylan James, Bristol (GB)

(73) Assignee: Airbus Operations Limited, Bristol (GB)

(*) Notice: Subject to any disclaimer, the term of this patent is extended or adjusted under 35 U.S.C. 154(b) by 60 days.

(21) Appl. No.: 14/387,087

(22) PCT Filed: Mar. 19, 2013

(86) PCT No.: PCT/GB2013/050709
§ 371 (c)(1),
(2) Date: Sep. 22, 2014

(87) PCT Pub. No.: WO2013/140156
PCT Pub. Date: Sep. 26, 2013

(65) Prior Publication Data
US 2015/0053821 A1  Feb. 26, 2015

(30) Foreign Application Priority Data
Mar. 21, 2012 (GB) .................. 1204941.7

(51) Int. Cl.
B64D 37/02 (2006.01)
B64D 37/00 (2006.01)
B64C 3/34 (2006.01)

(52) U.S. Cl.
CPC . B64D 37/00 (2013.01); B64C 3/34 (2013.01); B64D 37/005 (2013.01)

(58) Field of Classification Search
None
See application file for complete search history.

(56) References Cited

U.S. PATENT DOCUMENTS

| 1,841,691 | A  | * | 1/1932 | Wilson | B60K 15/03504 220/371 |
| 3,199,812 | A  | * | 8/1965 | Spoecker | B64D 37/32 244/135 R |
| 6,440,317 | B1 | * | 8/2002 | Koethe | B01D 17/0217 123/541 |
| 7,500,384 | B2 | * | 3/2009 | Dumortier | B64D 37/02 73/40.7 |
| 7,556,223 | B2 | * | 7/2009 | Acheson | B64C 1/1453 244/129.1 |
| 8,117,909 | B1 | * | 2/2012 | LaClair | B64D 37/005 244/134 R |
| 8,915,234 | B2 | * | 12/2014 | Gulke | B60K 15/0406 123/520 |
| 2005/0241700 | A1 | * | 11/2005 | Cozens | B64D 37/14 137/587 |

(Continued)

FOREIGN PATENT DOCUMENTS

| EP | 2 253 538 | 11/2010 |
| GB | 2 471 868 | 1/2011 |

OTHER PUBLICATIONS

International Search Report for PCT/GB2013/050709, mailed Jul. 4, 2013, 4 pages.

(Continued)

*Primary Examiner* — Medhat Badawi
(74) *Attorney, Agent, or Firm* — Nixon & Vanderhye P.C.

(57) ABSTRACT

An aircraft fuel tank vent opening having a liquid separation nozzle, the liquid separation nozzle and the opening dimensioned such that migration across the liquid separation nozzle to the underside of a wing, of fuel escaping from the vent opening, is inhibited during normal operating conditions.

6 Claims, 1 Drawing Sheet

(56) References Cited

U.S. PATENT DOCUMENTS

Figure 1:
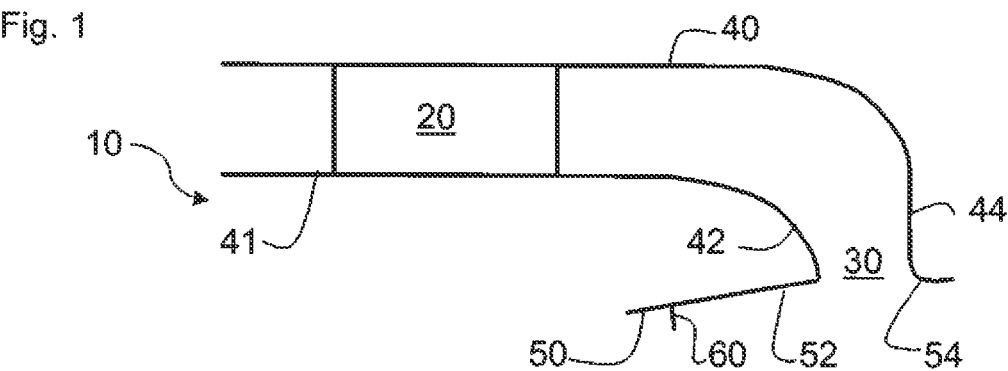

| | | | | |
|---|---|---|---|---|
| 2010/0032525 A1* | 2/2010 | Piesker | B64C 1/1453 | 244/136 |
| 2010/0224171 A1* | 9/2010 | Peters | F02M 25/089 | 123/520 |
| 2010/0293917 A1* | 11/2010 | Handley | B64C 1/1453 | 60/39.08 |
| 2011/0256042 A1* | 10/2011 | Tichborne | B01D 53/265 | 423/219 |
| 2012/0000864 A1* | 1/2012 | Lam | B01D 17/0217 | 210/787 |
| 2013/0168111 A1* | 7/2013 | Wong | A62C 2/04 | 169/62 |
| 2013/0320146 A1* | 12/2013 | Basset | B64D 37/06 | 244/135 C |
| 2015/0053821 A1* | 2/2015 | James | B64C 3/34 | 244/135 R |
| 2015/0232193 A1* | 8/2015 | Takahashi | B64D 37/005 | 244/129.2 |

OTHER PUBLICATIONS

UK Search Report for GB Application No. 1204941.7, dated Jun. 28, 2012, 1 page.

* cited by examiner

VENT FOR AN AIRCRAFT WING FUEL TANK

This application is the U.S. national phase of International Application No. PCT/GB2013/050709, filed 19 Mar. 2013, which designated the U.S. and claims priority to GB Application No. 1204941.7, filed 21 Mar. 2012, the entire contents of each of which are hereby incorporated by reference.

The present invention relates to a vent for an aircraft wing fuel tank.

Vents are commonly found on the underside of an aircraft wing, these allow air to escape from the fuel tanks when the aircraft is refuelled for example, or when the fuel within the tanks is heated, for example. Various measures are put in place to prevent the escape of fuel via these vents, however some leakage can occur.

This leakage can be due to a combination of capillary action and surface tension resulting in "back flow" or tracking. To prevent this escaped fuel migrating to hot surfaces on the aircraft such as the engines or brakes, a drip fence is commonly installed on the underside of the wing, inboard of the vent, running in the line of flight. This prevents any migration of the fuel further inboard. This has a drag penalty, as the drip fence is in the free air.

It is an object of the invention to provide an improved vent for an aircraft wing fuel tank.

According to the first aspect of the present invention there is provided an aircraft wing having a fuel tank vent, the vent terminating at an opening in a wing surface, the fuel tank vent having a liquid separation nozzle, the liquid separation nozzle extending from an inside surface of the fuel tank vent at a position inward of the opening, and terminating substantially in line with the opening, a gap being defined between the nozzle and the opening such that that migration of fuel escaping from the vent from the liquid separation nozzle to the wing surface is inhibited.

The liquid separation nozzle is incorporated in the ventilation duct opening to prevent liquid fuel tracking down the wing by providing an air void between the fuel discharge and surrounding structure. This ensures any fuel discharge from the fuel tank vent system, which occurs as a result of specific failure mechanisms, falls cleanly from the aircraft preventing tracking down the underside of the wing to potential ignition sources. Normal operating conditions include a flight cycle (take-off, climb, cruise, descent, landing and taxiing) and standing at an airport or on a runway for extended periods of time. This arrangement negates the requirement for a drip fence, thus presenting an aerodynamic advantage. A more efficient manufacturing stream results also, as part count and assembly operations are reduced.

Preferably, the wing surface is the lower wing surface,

Preferably, the vent opening is a NACA duct.

The use of a NACA duct to provide increases in in-tank pressure, is common in fuel tank ventilation.

Preferably, the vent opening has an inside surface, the lower surface of the wing has an inboard side, the inboard side featuring an anti-ice slope, wherein the junction of the inside surface of the vent opening and the anti-ice slope is separated from the liquid separation nozzle by at least 10 mm.

Preferably, the vent opening has an inside surface, the lower surface of the wing has an outboard side, the outboard side featuring an anti-ice curve, wherein a tangent to the junction of the inside surface of the vent opening and the anti-ice curve presents an angle of 20 degrees to a line drawn perpendicular to the end of the liquid separation nozzle.

Preferably, the liquid separation nozzle of the vent opening has a depth of 15 mm.

Figure 2:
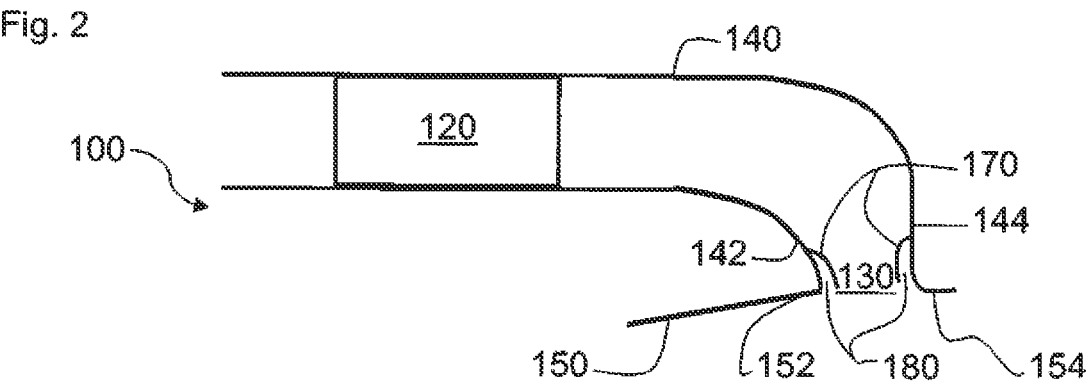
Figure 3:
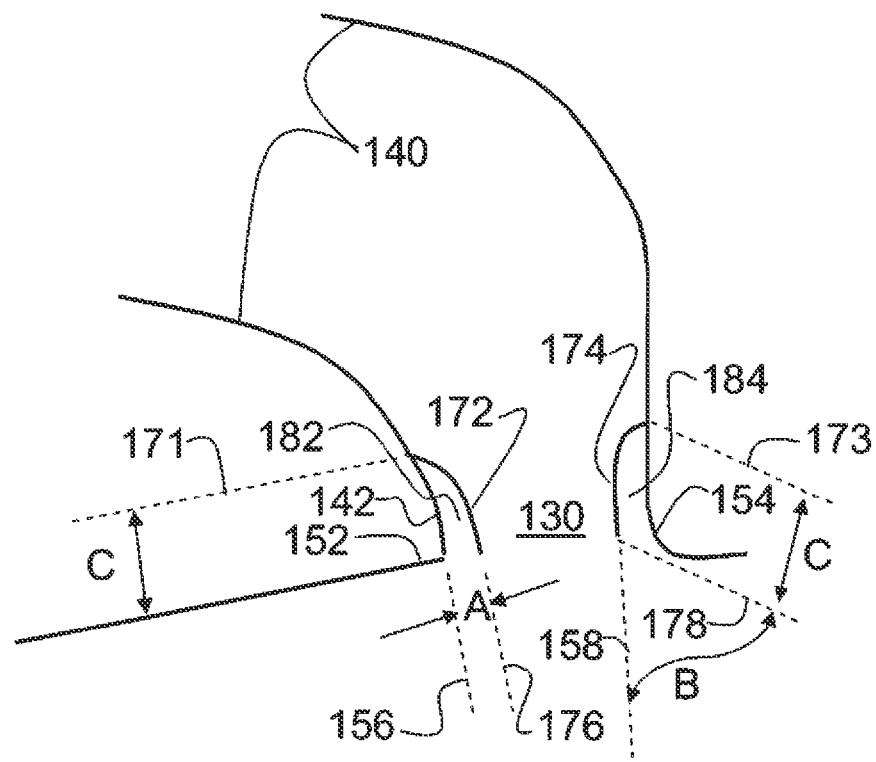

FIG. 1 is a perspective view of a prior aircraft fuel tank vent opening,

FIG. 2. is a similar perspective view of an aircraft fuel tank vent opening, in accordance with the invention, and FIG. 3 is a magnified view of the liquid separation nozzle of the aircraft fuel tank vent opening of FIG. 2.

In FIG. 1, a known aircraft fuel tank vent opening 10 comprises a duct 40 with a straight section 41 and a dog leg 42. The duct 40 is generally orientated inboard to outboard on an aircraft wing (not shown).

The duct connects a fuel tank (not shown) to an opening 30 to the atmosphere at the junction of the duct 40 and the wing lower surface 50. A flame arrestor 20 is positioned in the straight section 41 of the duct 40.

The duct 40 is predominantly uniform in cross section until the dog leg. At the dog leg, the distance between the inside curved wall 42 and outside curved wall 44 (as drawn) varies to provide an opening 30. The inside curved wall 42 meets the lower wing skin 50 at an anti ice slope 52 and the outside curved wall 44 meets the lower wing skin 50 at an anti ice curve 54.

A drip fence 60 is positioned on the wing lower surface 50, inboard of the vent opening 30 and running fore/aft along the wing.

FIG. 2 shows an aircraft fuel tank vent opening 100 similarly in many respects to that of FIG. 1 but embodying the invention. Similar features have been given similar numbering, prefixed by a "1".

Unlike aircraft fuel tank vent opening 10 of FIG. 1, aircraft fuel tank vent opening 100 features a liquid separation nozzle 170 at the opening 130 of the duct 140. This replaces the drip fence 60 of the aircraft fuel tank vent opening 10 of FIG. 1. The liquid separation nozzle 170 (as drawn) extends radially inwardly from the inside curved wall 42 and the outside curved wall 144, at a position spaced inwardly from the opening 130. A gap 180 is therefore formed between the liquid separation nozzle 170 and the walls of the duct 140.

FIG. 3 shows a magnified view of the liquid separation nozzle 170 of the aircraft fuel tank vent opening 100 of FIG. 2. Three dimensions A, B and C define the form of the liquid separation nozzle 170.

Dimensioning line 156, is drawn tangential to the inside curved wall 142 at the point where the inside curved wall 142 meets the anti-ice slope 152. Dimensioning line 176 is drawn tangential to the termination of the liquid separation nozzle wall 172. The separation of the dimensioning lines 156 and 176, is designated A. Separation A is at least 10 mm, to ensure there is no migration of escaping fuel from the liquid separation nozzle 170 to the anti-ice slope 152, across the gap 182.

Dimensioning line 158 is drawn tangential to the termination of the liquid separation nozzle line 174. Dimensioning line 178 emanates from the termination of the liquid separation nozzle line 174 and is drawn tangential to the anti-ice curve 154. The angle between dimensioning line 158 and dimensioning line 178 is designated B. Angle B is at least 6 degrees to ensure there is no migration of fuel from the liquid separation nozzle 170 to the anti-ice curve 154, across the gap 184.

Dimensioning line 171 is drawn from where the liquid separation nozzle line 172 emanates from the curved wall 142, parallel to the anti-ace slope 152. Dimensioning line 173 is drawn from where the liquid separation nozzle line 174 emanates from the curved wall 144, parallel to the dimensioning line 178. The separation of lines 152 and 171 and the separation of lines 178 and 173, is designated C and approximates the length of the liquid separation nozzle 170. Separation C is at least 5 mm to maintain separation of the fuel from the vent opening 100.

It will be clear to those persons skilled in the art that the dimensions described above are provided by way of example only, and according to appropriate scaling and implementation, aircraft they tank openings having liquid separation nozzles of varying dimensions may be used to achieve the same result.

The invention claimed is:

1. An aircraft wing having a fuel tank vent, the vent terminating at an opening in a wing surface, the fuel tank vent having a liquid separation nozzle, the liquid separation nozzle extending from an inside surface of the fuel tank vent at a position inward of the opening, and terminating substantially in line with the opening, a gap being defined between the nozzle and the opening such that migration of fuel escaping from the vent from the liquid separation nozzle to the wing surface, is inhibited.

2. The aircraft wing of claim 1 wherein the wing surface is the lower wing surface.

3. The aircraft wing of claim 1, wherein the vent opening is a NACA duct.

4. The aircraft wing of claim 1, wherein the vent opening has an inside surface, the lower surface of the wing has an inboard side, the inboard side featuring an anti-ice slope, wherein the junction of the inside surface of the vent opening and the anti-ice slope is separated from the liquid separation nozzle by at least 10 mm.

5. The aircraft wing of claim 1, wherein the vent opening has an inside surface, the lower surface of the wing has an outboard side, the outboard side featuring an anti-ice curve, wherein a tangent to the junction of the inside surface of the vent opening and the anti-ice curve presents an angle of 20 degrees to a line drawn perpendicular to the end of the liquid separation nozzle.

6. The aircraft wing of claim 1, wherein the liquid separation nozzle of the vent opening has a depth of 15 mm.

* * * * *